May 15, 1923.

J. H. RIGBY 1,454,907

ART OF MANUFACTURING SOLES

Filed May 12, 1920

INVENTOR

John H. Rigby
By his Attorney,
Nelson W. Howard

Patented May 15, 1923.

1,454,907

UNITED STATES PATENT OFFICE.

JOHN H. RIGBY, OF SALEM, MASSACHUSETTS, ASSIGNOR TO UNITED SHOE MACHINERY CORPORATION, OF PATERSON, NEW JERSEY, A CORPORATION OF NEW JERSEY.

ART OF MANUFACTURING SOLES.

Application filed May 12, 1920. Serial No. 380,782.

*To all whom it may concern:*

Be it known that I, JOHN H. RIGBY, a citizen of the United States, residing at Salem, in the county of Essex and State of Massachusetts, have invented certain Improvements in the Art of Manufacturing Soles, of which the following description, in connection with the accompanying drawings, is a specification, like reference characters on the drawings indicating like parts in the several figures.

This invention relates to an improved sole and a method of manufacturing it and is herein illustrated in connection with a method of making a so-called rubber sole for a turn shoe, this type of sole being usually made wholly or in greater part of rubber or rubberized material and commonly comprising a body portion of rubber or rubberized material and a reinforcing layer or strip of fabric such as canvas.

In the manufacture of turn shoes whether the soles are of leather or of rubber, it is the common practice to attach the shank stiffener to the sole after the shoe has been turned since otherwise the stiffener would interfere with the turning operation and would be more or less distorted. In the case of leather-soled turn shoes, the shank stiffener is commonly attached by means of cement but with rubber soles such mode of attachment is impracticable for the reason, among others, that it does not produce a bond which is sufficiently strong.

It is an object of the present invention to produce an improved sole for shoes in which convenient and efficient means are provided for attaching a shank stiffener as well as to provide a suitable method for manufacturing such a sole.

The invention is exemplified in the manufacture of a so-called rubber sole comprising a body portion of rubber or rubberized material having embedded in and vulcanized to its upper or foot-supporting surface a reinforcing layer of fabric, a suitable portion of the fabric in the shank of the sole being free from the body portion to permit a shank stiffener to be slipped beneath said portion; this shank stiffener holding portion of the fabric having been prevented from becoming embedded in and vulcanized to the body portion of the sole by placing beneath it, before the vulcanizing operation is carried out, a strip of paper or other non-vulcanizable material.

Referring now to the accompanying drawings,—

The sole comprises a body portion 3 of rubber, rubber compound or rubberized material, which for convenience will be referred to as rubber, and a reinforcing layer 5 of canvas or other suitable fabric, and has molded on its upper face a sewing rib 7. The middle portion of the sole has its upper surface located in approximately the same plane as that of the top of the rib, and is separated from the rib by a gutter 9. Soles of this general type are commonly manufactured by dieing out the rubber blank and the fabric blank separately the rubber blank being at that time in an unvulcanized or uncured condition, laying the fabric blank upon the rubber blank, placing both blanks in a suitably shaped vulcanizing mold, and then placing the mold in a vulcanizing press and subjecting it to heat and pressure. The sole, as thus far described, and the general method of making it have been in use for some time and the details of construction of the sole and of procedure of the method form no part of the present invention.

Figure 1:
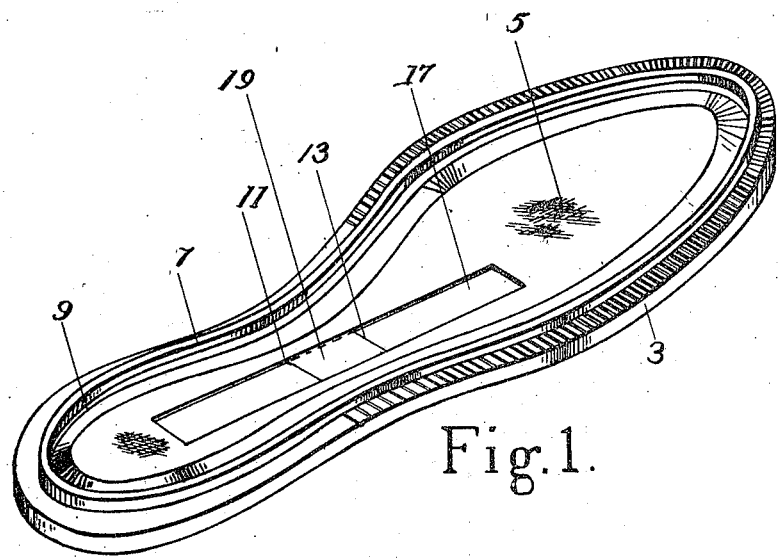
Fig. 1 is a perspective of a completed sole.
Figure 2:
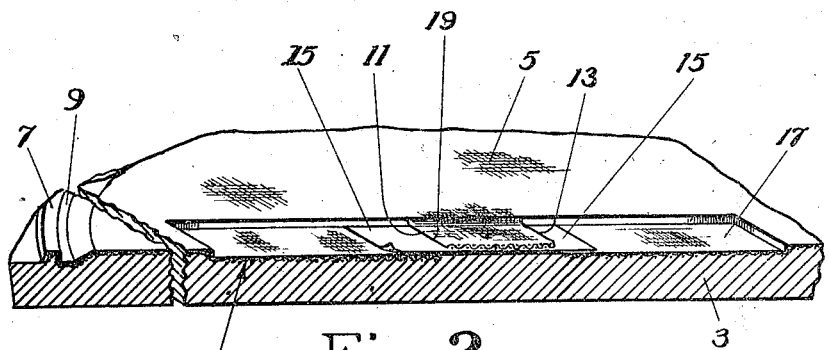
Fig. 2 is a perspective on an enlarged scale and partly in section of a portion of the sole.

In order to provide means for holding a shank stiffener, the fabric blank, prior to being laid upon the rubber blank, is slit at two places 11, 13, and a strip of non-vulcanizable material 15 such as paper is drawn through the slits. The fabric blank with the paper strip is then laid on the uncured rubber blank, and the molding and vulcanizing operation carried out. In order to ensure that the shaft-stiffener when in place shall not project unduly above the surface of the finished sole, one of the vulcanizing molds is provided with a projection to form in the upper surface of the sole a depression 17, said depression being of a size slightly greater than that of the shank stiffener and being so located that its side walls meet the ends of the slits 13. In practice the slits are made at the time the fabric blank is died out; the die being so proportioned with respect to the mold that the relation of the slits 11, 13 to the depression 17, which has been described above, results in the finished sole. In Fig. 2, the strip of paper 15 has been shown intact as though the vulcanizing operation had no effect upon it. In reality the flimsy paper which I am now using very nearly disappears during the vulcanizing operation and does not have to be removed but nevertheless fulfills its function of preventing the strap 19 which extends across the depression 17 from adhering to the rubber body of the sole. If desired, the non-vulcanizable strip 15 may be made of any suitable material other than paper and may be removed after the vulcanizing operation.

In the manufacture of a shoe having a sole such as that which has just been described, the usual operations including sewing the assembled upper to the rib 7, pulling the first last and turning the shoe are carried out, and then the shank stiffener is inserted beneath the strap 19 and pushed along until it lies in the depression 17. It will be understood that the shank stiffener is longitudinally curved to correspond to the curve of the last or foot and acts to conform the sole to this curvature.

Having thus described my invention, what I claim as new and desire to secure by Letters Patent of the United States is:

1. As an article of manufacture, a molded and vulcanized sole for a turn shoe having a passage leading from the upper surface into the shank portion thereof and adapted to receive and hold in place a shank stiffener after the shoe in which the sole is incorporated has been turned right side out.

2. As an article of manufacture, a sole of rubber or rubberized material having means for holding a shank stiffener in place, said means comprising an integral portion of the sole partly separated from the rest of the sole to permit a shank stiffener to be slipped beneath said portion.

3. As an article of manufacture, a sole comprising a body of rubber or rubberized material and a reinforcing layer of fabric embedded in and vulcanized to one side thereof, a part of the fabric in the shank portion of the sole being free from the body portion to provide means for permitting a shank stiffener to be slipped beneath the free portion of the fabric.

4. As an article of manufacture, a molded and vulcanized sole having a strap integral therewith extending transversely of the sole and located in the shank portion thereof beneath which a shank stiffener may be placed with its ends projecting beyond the front and rear of the strap.

5. As an article of manufacture, a sole having a passageway in the shank portion thereof leading from the top surface of the sole down into the body thereof and emerging again to the top surface to provide means for holding a shank stiffener in place.

6. As an article of manufacture, a sole having a longitudinally extending depression in the shank portion thereof to receive a shank stiffener, and a strap adapted to extend across the stiffener at a locality spaced from the ends thereof and out of contact with said ends.

7. As an article of manufacture, a sole having a longitudinally extending depression in the shank portion thereof to receive a shank stiffener, there being a passageway of substantially the width of the depression leading from the floor of the depression into the body of the sole and emerging again to the floor to provide means for holding a shank stiffener in the depression.

8. As an article of manufacture, a sole comprising a body of vulcanized material and a layer of reinforcing material embedded in the top thereof, the reinforcing material being slit at two localities in the shank portion of the sole and being free from the body of the sole between the slits to provide means for holding a shank stiffener in place.

9. As an article of manufacture, a sole comprising a body of vulcanized material and a layer of reinforcing material embedded in the top thereof, the sole having a longitudinally extending depression in its shank portion, the reinforcing material being free from the body of the sole throughout a portion of the depression to provide means for permitting a shank stiffener to be slipped into place beneath the reinforcing material.

10. The method of making soles for shoes which comprises providing a sole blank of vulcanizable material and a sole-reinforcing blank having an opening therein, introducing through the opening a strip of non-vulcanizable material so that a part of the strip lies between the sole blank and the reinforcing blank, and then molding and vulcanizing the sole.

11. The method of making soles for shoes which comprises assembling a sole blank of vulcanizable material and a sole-reinforcing blank having in its shank portion two slits through which extends a strip of non-vulcanizable material, and then molding and vulcanizing the assembled sole.

12. The method of making soles for shoes which comprises assembling a sole blank of vulcanizable material and a sole-reinforcing fabric blank having in its shank portion two slits through which extends a strip of paper, and then molding and vulcanizing the assembled sole.

13. As an article of manufacture a sole comprising a body of vulcanized material and a layer of fabric embedded in the top thereof, said sole having a sewing rib, there being in the shank portion of the sole a passageway leading from the upper surface down beneath the fabric and emerging again to the surface to provide means for holding a shank stiffener in place.

14. As an article of manufacture a sole comprising a body of vulcanized material and a layer of fabric embedded in the top thereof, said sole having a sewing rib the plane of the top of which is substantially flush with the upper surface of the middle portion of the sole and separated from said middle portion by a gutter, a portion of the fabric being free from the body of the sole in the locality of the shank to form a strap beneath which a shank stiffener may be slipped.

15. As an article of manufacture a sole comprising a body of vulcanized material and a layer of reinforcing fabric embedded in the top thereof, there being a sewing rib near the margin of the sole, the middle portion of the sole having its upper surface substantially in the plane of the top of the rib and being separated from the rib by a gutter, there being in the shank portion of the sole a depression and across the depression a strap free from the adjacent portion of the sole and beneath which a shank stiffener may be slipped so as to lie in the depression.

In testimony whereof I have signed my name to this specification.

JOHN H. RIGBY.